United States Patent
Balabhadruni et al.

(10) Patent No.: US 10,009,747 B2
(45) Date of Patent: Jun. 26, 2018

(54) EMERGENCY CONTACT NOTIFICATION IN IP MULTIMEDIA SUBSYSTEM (IMS)

(71) Applicant: TELEFONAKTIEBOLAGET LM ERICSSON (PUBL), Stockholm (SE)

(72) Inventors: Venkata Ramesh Balabhadruni, Kista (SE); Fredrik Lindholm, Tokyo (JP)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days. days.

(21) Appl. No.: 15/319,518

(22) PCT Filed: Jun. 17, 2014

(86) PCT No.: PCT/EP2014/062724
§ 371 (c)(1),
(2) Date: Dec. 16, 2016

(87) PCT Pub. No.: WO2015/192891
PCT Pub. Date: Dec. 23, 2015

(65) Prior Publication Data
US 2017/0156045 A1    Jun. 1, 2017

(51) Int. Cl.
*H04W 4/90* (2018.01)
*H04W 4/22* (2009.01)
(Continued)

(52) U.S. Cl.
CPC ........... *H04W 4/90* (2018.02); *H04L 61/1594* (2013.01); *H04L 65/105* (2013.01);
(Continued)

(58) Field of Classification Search
CPC ..... H04L 65/1016; H04L 29/12; H04L 29/06; H04L 61/1594; H04L 65/105; H04L 61/3085; H04L 65/00; H04W 8/04; H04W 4/02; H04W 4/22; H04W 4/14; H04W 4/90; H04W 76/50; H04W 4/06; H04M 3/5116; H04M 3/5183; H04M 1/2535; H04M 3/5191; H04M 7/123; H04M 3/51
See application file for complete search history.

(56) References Cited

U.S. PATENT DOCUMENTS

| 8,538,374 B1 | 9/2013 | Haimo et al. |
| 2004/0037406 A1* | 2/2004 | Gourraud ............ H04L 12/1822 379/202.01 |

(Continued)

OTHER PUBLICATIONS

3GPP TS 23.167 V11.10.0 3rd Generation Partnership Project; Technical Specification Group Services and System Aspects; IP Multimedia Subsystem (IMS) emergency sessions (Release 11), Mar. 2014.

(Continued)

*Primary Examiner* — Meless Zewdu

(57) ABSTRACT

A method of operating an emergency call procedure in a telecommunications network includes storing, for a user of an IMS network, emergency contact Uniform Resource Identifiers (URIs) of one or more emergency contacts of the user who may be contacted by emergency services in the event of an emergency call from the user. The method also includes receiving an emergency call from the user and providing the emergency contact URIs to a Public Safety Answering Point, PSAP.

14 Claims, 5 Drawing Sheets

(51) Int. Cl.

| | |
|---|---|
| *H04L 29/06* | (2006.01) |
| *H04W 8/04* | (2009.01) |
| *H04M 3/51* | (2006.01) |
| *H04L 29/12* | (2006.01) |
| *H04W 4/02* | (2018.01) |
| *H04M 7/12* | (2006.01) |
| *H04W 4/14* | (2009.01) |

(52) U.S. Cl.
CPC ....... *H04L 65/1016* (2013.01); *H04M 3/5116* (2013.01); *H04W 4/02* (2013.01); *H04W 4/22* (2013.01); *H04W 8/04* (2013.01); *H04L 61/3085* (2013.01); *H04M 7/123* (2013.01); *H04W 4/14* (2013.01)

(56) References Cited

U.S. PATENT DOCUMENTS

| | | | | |
|---|---|---|---|---|
| 2007/0025337 | A1* | 2/2007 | Polk | H04L 29/12113 370/352 |
| 2007/0135106 | A1* | 6/2007 | Sung | H04W 4/10 455/414.1 |
| 2007/0165833 | A1* | 7/2007 | Wolter | H04L 29/06027 379/355.02 |
| 2008/0063153 | A1* | 3/2008 | Krivorot | H04M 3/42348 379/45 |
| 2008/0080480 | A1* | 4/2008 | Buckley | H04L 12/66 370/352 |
| 2008/0146220 | A1* | 6/2008 | Duan | H04W 36/0022 455/432.1 |
| 2009/0116623 | A1* | 5/2009 | Ku | H04L 29/1216 379/45 |
| 2009/0202047 | A1* | 8/2009 | Jaro | H04L 65/1069 379/37 |
| 2009/0228596 | A1* | 9/2009 | Yang | H04L 67/26 709/228 |
| 2010/0135205 | A1* | 6/2010 | Li | H04W 4/22 370/328 |
| 2010/0215153 | A1 | 8/2010 | Ray et al. | |
| 2010/0246780 | A1* | 9/2010 | Bakker | H04L 65/40 379/38 |
| 2010/0262668 | A1* | 10/2010 | Piett | H04W 4/22 709/206 |
| 2011/0058658 | A1* | 3/2011 | Li | H04W 4/22 379/45 |
| 2014/0228057 | A1* | 8/2014 | Uga | H04W 64/00 455/456.3 |

OTHER PUBLICATIONS

3GPP TS 24.229 V11.11.0 3rd Generation Partnership Project; Technical Specification Group Core Network and Terminals; IP multimedia call control protocol based on Session Initiation Protocol (SIP) and Session Description Protocol (SDP); Stage 3 (Release 11), Mar. 2014.

3GPP TS 29.173 V12.1.0 3rd Generation Partnership Project; Technical Specification Group Core Network and Terminals; Location Services (LCS); Diameter-based SLh interface for Control Plane LCS (Release 12), Dec. 2013.

* cited by examiner

EMERGENCY CONTACT NOTIFICATION IN IP MULTIMEDIA SUBSYSTEM (IMS)

This application is a 371 of International Application No. PCT/EP2014/062724, filed Jun. 17, 2014, the disclosure of which is fully incorporated herein by reference.

TECHNICAL FIELD

The present disclosure relates to improved mechanisms for notifying emergency contacts of a user of a telecommunications network when an emergency call has been placed. In particular the mechanisms relate to emergency calls over an IP Multimedia Subsystem (IMS) network.

BACKGROUND

The IP Multimedia Subsystem (IMS) is the technology defined by the Third Generation Partnership Project (3GPP) to provide IP Multimedia services over mobile communication networks. The IMS makes use of the Session Initiation Protocol (SIP) to set up and control calls or sessions between user terminals (or user terminals and application servers). Whilst SIP was created as a user-to-user protocol, the IMS introduces additional functionality for e.g. subscription handling, security and charging to allow operators and service providers to control user access to services and to charge users accordingly.

FIG. 1 is a network diagram illustrating schematically how the IMS fits into mobile network architecture in the case of a General Packet Radio Service (GPRS) access network. The IMS 3 includes a core network 3a, and a Service Network 3b. Call/Session Control Functions (CSCFs) 4 operate as SIP proxies within an IMS core network 3a. User Equipment (UE) 2 accesses the IMS 3 via an IP Connectivity Access Network (IP-CAN) and gateway nodes in a connectivity layer 1. A Home Subscriber Server HSS 8 keeps a log of users' subscription profiles that define the services that the user has subscribed to. After registering, the user is able to establish a communication session with other peers, making use of the multimedia capabilities of the IMS. The 3GPP architecture defines a number of types of CSCFs including: a Proxy CSCF (P-CSCF) which is the first point of contact for the user within the IMS core network 3a; a Serving CSCF (S-CSCF) controls the provision of services to the users in accordance with the user's subscription; an Interrogating CSCF (I-CSCF) whose role is to identify the correct S-CSCF, based on the user's subscription profile which it obtains from the user's HSS 8, and to forward to that S-CSCF a request received from a SIP terminal via a P-CSCF.

IMS Emergency Services specified in the 3rd Generation partnership project (3GPP) Technical Specification (TS), 3GPP TS 23.167 define the architecture and mechanisms required for a user to be able to establish IMS emergency sessions towards Emergency Centers and Public Safety Answering Points (PSAPs). This architecture includes an Emergency CSCF (E-CSCF).

The related detailed mechanisms are defined in TS 24.229 including the means by which a UE indicates that an IMS Registration is triggered for the purpose of establishing an emergency session; and the means by which an IMS emergency session is established. Additionally, TS 24.229 defines the means by which the IMS serving network detects that an IMS session is established for the emergency service. The P-CSCF must be prepared to detect an emergency session even if the UE does not use the emergency service URN.

When an emergency call is made, it may often be that there are friends, family members or other trusted associates of the user who are nearby and could be notified or contacted to assist the emergency services. The present disclosure provides mechanisms by which this can be achieved.

SUMMARY

In one aspect embodiments provide a method of operating an emergency call procedure in a telecommunications network. The method includes storing, for a user of an IMS network, emergency contact Uniform Resource Identifiers (URIs) of one or more emergency contacts of the user who may be contacted by emergency services in the event of an emergency call from the user. The method also includes receiving an emergency call from the user and providing the emergency contact URIs to a Public Safety Answering Point, PSAP.

In another aspect, embodiments provide a telecommunications network entity configured as a Location Retrieval Function (LRF) or a Gateway Mobile Location Centre (GMLC). The network entity includes a memory for storing data, an interface for transmitting and receiving communications with other network entities, including at least a Home Subscriber Server (HSS) of a user and a Public Safety Answering Point (PSAP), and a processor. The processor controls operation of the network entity to store in the memory emergency contact URIs of one or more emergency contacts of the user who may be contacted by emergency services in the event of an emergency call from the user, and to provide the emergency contact URIs to the PSAP in response to a request received from the PSAP.

In another aspect embodiments provide a user entity, UE, adapted for wireless communications with a telecommunications network, including an IP Multimedia Subsystem, IMS, network. The UE includes a memory for storing data, an interface for transmitting and receiving communications, and a processor. The processor controls operation of the UE to store in the memory emergency contact URIs of one or more emergency contacts of the user who may be contacted by emergency services in the event of an emergency call from the user, and to provide the emergency contact URIs to the IMS network either when the UE registers in the IMS network, or during an emergency call procedure.

It is advantage that the emergency services provided by a PSAP are able to obtain contact information, and optionally also location information of the friends, family or other trusted associates of a user when the user makes an emergency call. This means that the emergency service can call or notify any of these contacts, either to assist in the emergency or to provide other important or potentially life-saving information.

DETAILED DESCRIPTION

Figure 1:
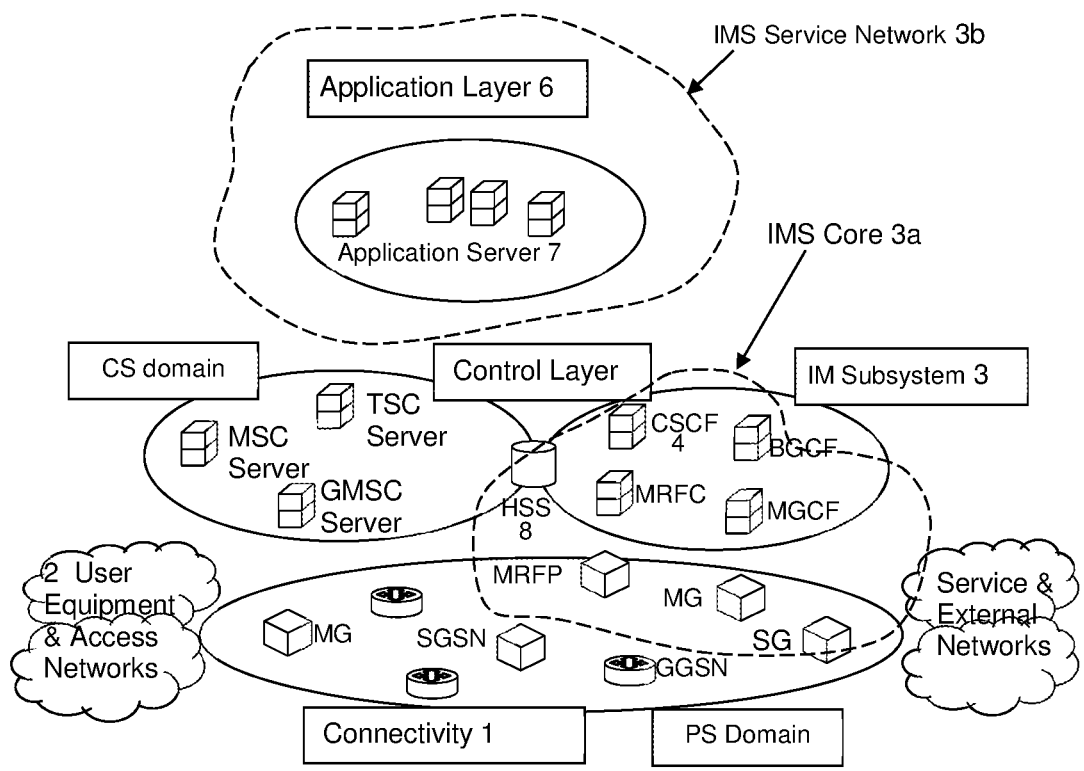
FIG. 1 is a network diagram illustrating schematically how the IMS fits into mobile network architecture in the case of a General Packet Radio Service (GPRS) access network.
Figure 2:
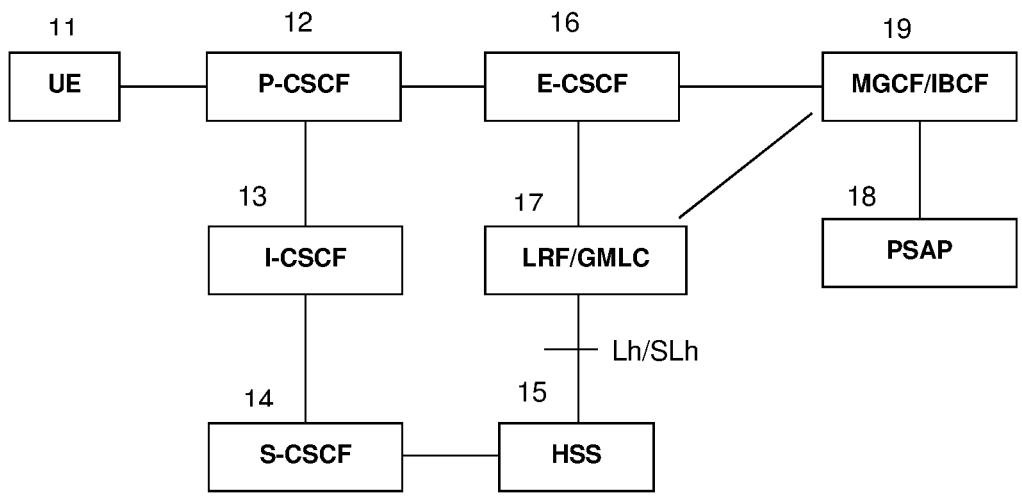
FIG. 2 is a schematic layout showing the principal network entities and communication links between them for implementing the presently described embodiments.

Referring to FIG. 2 there is shown a User Equipment (UE) 11, which accesses an IMS network. As described above with reference to FIG. 1, the IMS network includes: a Proxy CSCF (P-CSCF) 12 through which communications to/from the UE 11 are routed; an Interrogating CSCF (I-CSCF) 13; a Serving CSCF (S-CSCF) 14, and the user's Home Subscriber Server (HSS) 15. Also shown are: an Emergency CSCF (E-CSCF) 16; a Location Retrieval Function (LRF) or Gateway Mobile Location Centre (GMLC) 17, which keeps track of the physical/geographical location of user equipment, including UE 11; a Media Gateway Control Function (MGCF) or Interconnect Border Control Function (IBCF) 19, which routes communications between the IMS network and external network entities, which in this case include a Public Safety Answering Point (PSAP) 18. The connection paths shown in FIG. 2 are the ones used by the entities in the embodiments described below and are not necessarily the only paths or interfaces between the entities shown over which communications could occur.

Suppose that the user of UE 11 has an emergency. The user then performs an emergency registration of UE 11 and makes an emergency call. On some occasions, by the time the PSAP support team reach the user's location it may be too late for them to save or rescue the situation. However, it may be that there is a friend or family member or other trusted associate of the user who is nearby and could reach the location more quickly and take appropriate action if they could be contacted or notified. Also, for example, if the user has a known medical condition then it could be important to contact a friend or family member who would be able to inform the emergency services of this condition without delay.

However, under currently specified procedures, contacting a user's friends, family or other emergency contacts means carrying out tedious procedures of finding the user's phone to search for an emergency contact details or using some other source, such as a hospital the user has visited, or contacting the user's employer or a fellow employee who may have such information. The current 3GPP standards do not address this problem.

To overcome this problem, the embodiments described below are for mechanisms to deliver the emergency contact URIs, and optionally their current locations, to the PSAP 18 in the event of an emergency call. The PSAP 18 can then decide whether or not to call or notify (e.g. using an SMS message) an individual emergency contact. For example the decision could be based on the location of the emergency contact relative to the location of the UE 11 from which the emergency call was made.

Figure 3:
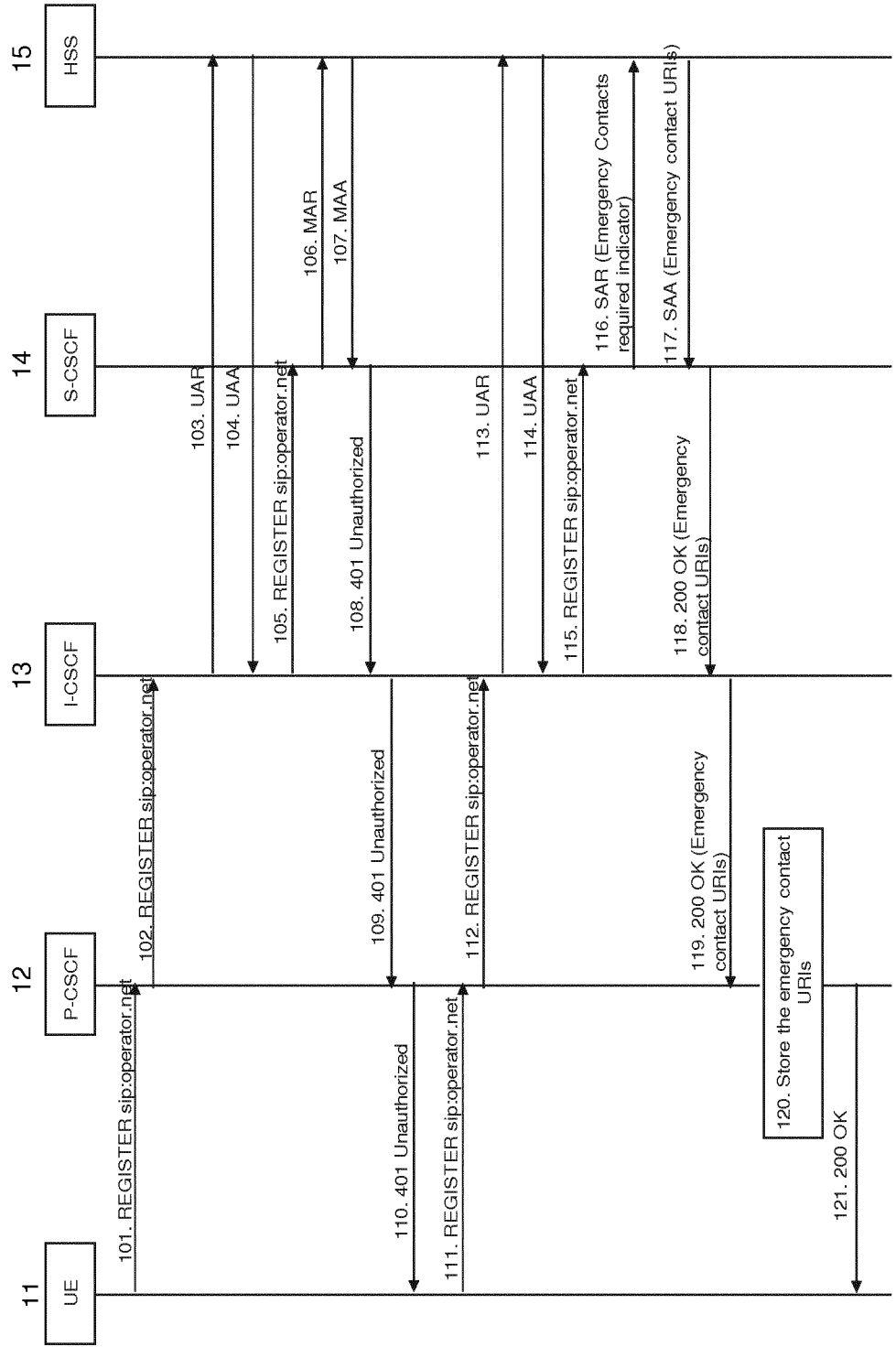
FIG. 3 is a signaling diagram illustrating a procedure for registering a user in an IMS network.
Figure 4:
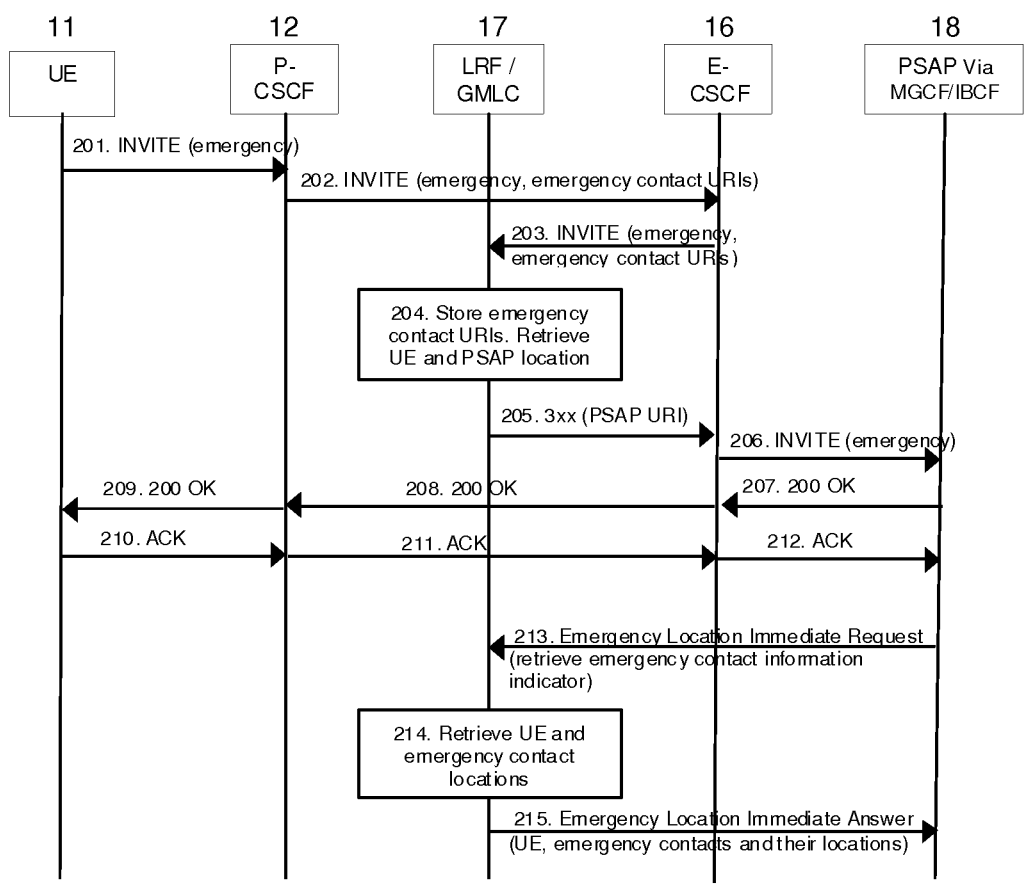
FIG. 4 is a signaling diagram illustrating a first embodiment of an emergency call procedure.

In the following embodiments, as described with reference to FIGS. 3 to 5, the network entities are described with reference to the same numerals as used in FIG. 2. In the following embodiments, the URI's are stored with the user's information in the HSS 15 subscriber database. Each emergency contact URI represents the calling address of the user's friend, family member or other trusted person. It is to be expected that a number of emergency contact URIs (preferably both TEL URI and SIP URI) are stored for each user. In a first embodiment, as shown in FIGS. 3 and 4, during the normal or emergency registration of a user, the S-CSCF 14 downloads the emergency contact URIs from the HSS 15 and delivers the downloaded emergency contact URIs to the P-CSCF 12 in response to the registration. If the same user makes an emergency call later, the P-CSCF 12 includes the emergency contact URIs in the emergency call and forwards these to the LRF/GMLC 17. When the emergency call is established, the PSAP 18, in addition requesting user location (i.e. location of UE 11), may request the LRF/GMLC 17 to provide the emergency contact URIs and optionally their locations. The PSAP 18, after receiving the user information, including user location, emergency contact URIs and optionally their locations, can decide whether or not to call or notify an individual emergency contact URI.

FIG. 3 illustrates a procedure by which a user's emergency contact URI's are downloaded when the user registers. The S-CSCF forwards the emergency contact URIs towards the P-CSCF 12 and the P-CSCF 12 stores the received emergency contact URIs. Steps 101 to 115 of FIG. 3 follow the standard procedure (see 3GPP TS 24.229) by which the UE 11 registers in the IMS via exchanges of signals including SIP REGISTER messages 101, 102, 105, 111, 112, 115, and the assignment of an S-CSCF 14 for the session. Then, at step 116, the S-CSCF 14 sends a Server-Assignment-Request (SAR) to the HSS 15, which includes an indicator that the user's emergency contacts are required. The HSS 15 then includes the emergency contact URIs in the Server-Assignment-Answer (SAA) message 117. The URIs are then sent back to the P-CSCF 12 together with the SIP 200 OK messages at steps 118 and 119. At step 120, the P-CSCF 12 stores the emergency contact URIs and at step 121 returns a 200 OK message to the UE.

Note that FIG. 3 illustrates a normal registration of UE 11. It is also possible for UE 11 to perform an emergency registration in accordance with procedures set out in the 3GPP standards. However, the procedure with regard to the downloading of the emergency contact URIs by the S-CSCF 14 would be essentially the same as for the normal registration.

FIG. 4 illustrates a procedure, following the registration (normal or emergency) as described above with reference to FIG. 3, in which the user makes an emergency call. At step 201 the UE 11 sends an emergency INVITE, which is received at the P-CSCF 12. The P-CSCF 12 detects the emergency call and includes the stored emergency contact URIs in an emergency INVITE 202 sent to the E-CSCF 16. Note that, in accordance with the procedures specified in 3GPP TS 23.167, the emergency call may be either a UE detectable emergency call or a non-UE detectable emergency call. The E-CSCF 16 interacts with the LRF/GMLC 17 (step 203) for routing the INVITE to the closest PSAP 18. At step 204 the LRF/GMLC 17 stores the received emergency contact URIs for this emergency session and determines the closest PSAP 18 in relation to the location of the UE 11. At step 205 The LRF/GMLC 17 returns the URI of the PSAP 18 (or this could be a list of PSAP URIs for the E-CSCF 16 to try or select from) in a 3xx response to the E-CSCF 16. The E-CSCF 16 routes the INVITE (step 206) towards the PSAP through MGCF or IBCF (not shown). The PSAP 18 accepts the emergency INVITE and the emergency call is established in accordance with standard procedures (steps 207-212).

When the emergency call has been established, the PSAP 18 can request the LRF/GM LC 17 to provide the emergency contact URIs, and optionally their locations, by including a retrieve emergency contact information indicator in an Emergency Location Immediate Request (step 213). At step 214 the LRF/GMLC 17 retrieves the UE 11 location, emergency contacts and optionally their locations and returns them in an Emergency Location Immediate Answer (step 215). The PSAP 18, after receiving the user information, which includes the user location as well as emergency contact URIs and optionally their locations, can make a decision whether or not to call or notify an individual emergency contact URI.

Note that some of the signal flows shown in FIG. 4 can occur in parallel (for example step 213 may be immediately after 207). Also, note that the LRF/GM LC 17 could, if required, retrieve the emergency contacts' locations at step 204 instead of at step 214.

As an alternative to the procedure shown in FIG. 4 and described above, where the emergency contact URIs are provided to the PSAP 18 in response to the Emergency Location Immediate Request (step 213), the E-CSCF 17 could include the emergency contact URIs in the INVITE request sent to the PSAP 18 (step 206). In that case, at step 213, the PSAP may selectively request the location information for some or all of the emergency contact URIs in an Emergency Location Immediate Request.

Figure 5:
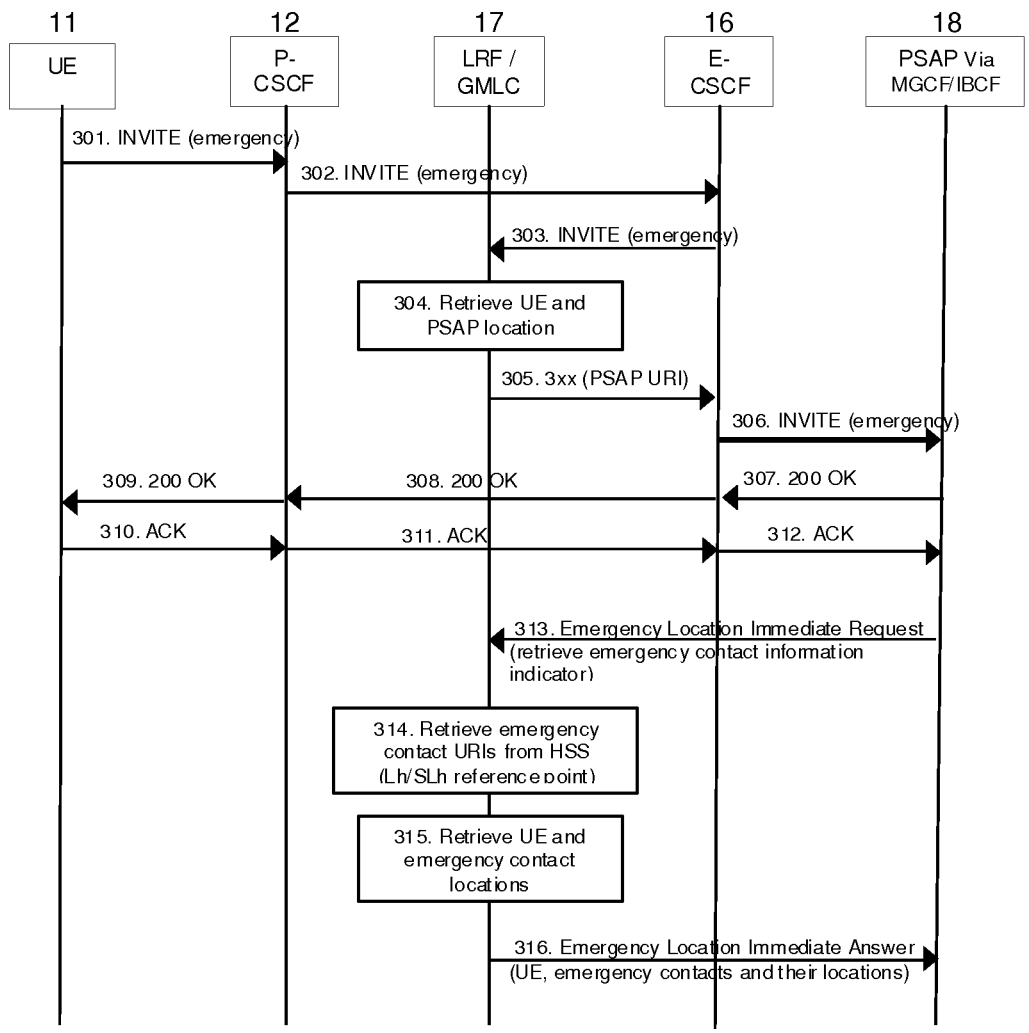
FIG. 5 is a signaling diagram illustrating a second embodiment of an emergency call procedure.

FIG. 5 illustrates the signal flows of another embodiment. Unlike the embodiment of FIGS. 3 and 4, in this embodiment the S-CSCF 14 does not download the emergency contact URIs at user registration. This means that the P-CSCF 12 does not store the emergency contact URIs and cannot forward them to the LRF/GMLC 17. Instead, after the emergency call is established, the PSAP 18 requests the LRF/GMLC 17 to provide the emergency contact URIs and optionally their locations. The LRF/GMLC can directly download the emergency contact URIs from the HSS 15 over the Lh or SLh reference point (as described in 3GPP TS 29.173)—see FIG. 2. The LRF/GMLC 17 retrieves the user and emergency contact URIs and their locations and forwards these to the PSAP 18.

Accordingly, as shown in FIG. 5 at steps 301 to 312, the emergency call is established in the standard manner with the INVITE from the UE 11 being sent via the P-CSCF 12 to the E-CSCF 16 and on to the LRF/GMLC 17, but without any emergency contact URIs (unlike in FIG. 4). At step 304 the LRF/GMLC retrieves the UE and PSAP locations and at step 305 returns the URI of the PSAP 18 to the E-CSCF 16, which then sends the emergency INVITE to the PSAP via the MGCF or IBCF (step 306). At step 313, after the emergency call is established, the PSAP 18 can request the LRF/GM LC 17 to provide the emergency contact URIs, and optionally their locations, by including the retrieve emergency contact information indicator in Emergency Location Immediate Request. At step 314 the LRF/GMLC 17 directly downloads the emergency contact URIs from the HSS 15 (not shown) using the Lh or SLh reference point (see FIG. 2). The LRF/GMLC 17 also retrieves the location of UE 11, and, if requested to do so, the locations of the emergency contacts and at step 316 returns this information to the PSAP 18 in an Emergency Location Immediate Answer. The PSAP 18, after receiving the user information, including the location of UE 11, emergency contact URIs and optionally their locations, can make a decision whether or not to call or notify any of individual emergency contact URIs.

The embodiments described above require that the URIs of the user's emergency contacts are stored at the HSS 15, and are then either downloaded as part of the registration procedure (FIG. 3) or are retrieved from the HSS 15 as part of the emergency call procedure (FIG. 5). However, it is possible that this information could be stored elsewhere. For example, the information could be stored an intermediate node between the UE 11 and IMS (e.g. a PBX—enterprise exchange), then such could also add the information when the UE 11 registers or initiates an emergency call. Another alternative to storing the information in the HSS 15 is for this information to be stored by the UE 11 and provided to the IMS network, either as part of the registration procedure (normal or emergency), or as part of the emergency call procedure (UE detected or non-UE detected). In other words, for the embodiment of FIGS. 3 and 4, instead of having the S-CSCF 14 download the emergency contact URIs from the HSS 15, the UE 11 itself would provide the emergency contact URIs to the P-CSCF 12 when it registers (step 101 or step 111 of FIG. 3). Alternatively, the UE 11 could provide the emergency contact URIs to the P-CSCF 12 together with the emergency INVITE at step 201 of FIG. 4. For the embodiment of FIG. 5, the UE could provide the emergency contact URIs to the P-CSCF 12 at step 301, and the P-CSCF would forward these to the E-CSCF (step 302), which would provide them to the LRF/GMLC 17 at step 303.

However, it is preferred that the information is stored at the user's HSS, as this relieves the user of any need to update the UE configuration information every time there is a change of UE.

Figure 6:
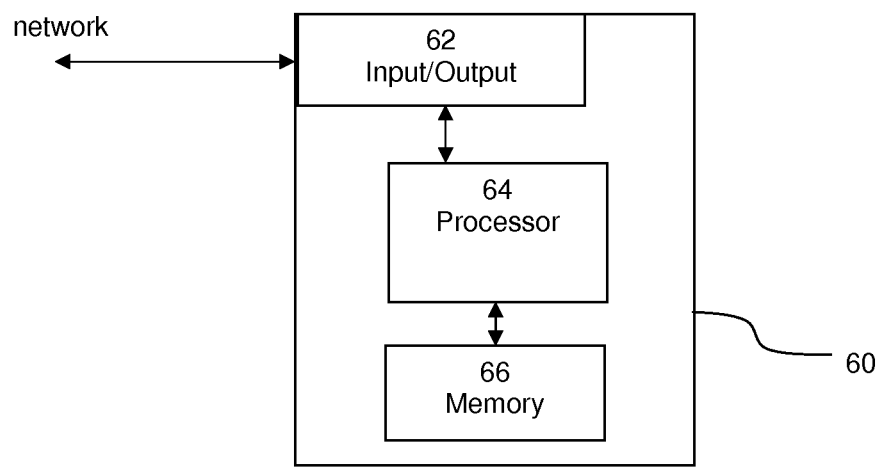
FIG. 6 is a block diagram illustrating the principal functional components of a network entity embodiment configured as a Location Retrieval Function (LRF) or a Gateway Mobile Location Centre (GMLC).

FIG. 6 is a schematic diagram illustrating the principal components of a telecommunications network entity 60 configured as a Location Retrieval Function, LRF, or a Gateway Mobile Location Centre, GM LC. The network entity 60 includes an input/output interface 62 for transmitting and receiving communications with other network entities, which would include at least a PSAP (via a MGCF or IBCF), and may also include a HSS of a user, an E-CSCF or other entities in an IMS network. A memory 66 is provided for storing data, including, for example, the user's URI. A processor 64 controls operation of the network entity, and is configured to store in the memory 66, the emergency contact URIs of one or more emergency contacts of the user, who may be contacted by emergency services in the event of an emergency call from the user. The entity 60 also provides the emergency contact URIs to the PSAP in response to a request received from the PSAP.

Figure 7:
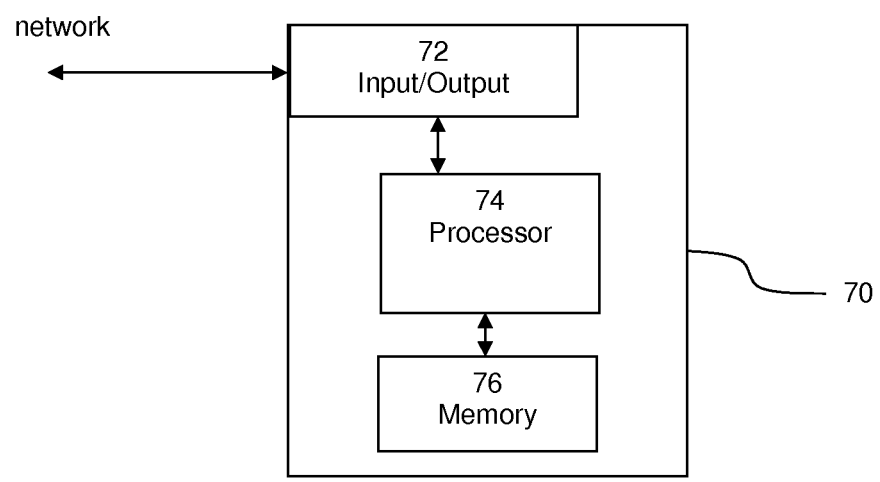
FIG. 7 is a block diagram illustrating the principal functional components of a User equipment (UE) embodiment.

FIG. 7 is a schematic diagram illustrating the principal components of a UE 70 adapted for wireless communications with a telecommunications network, including an IMS network. The UE 70 includes an input/output interface 72 for transmitting and receiving communications. A memory 76 is provided for storing data. A processor 64 controls operation of the UE 70, and is configured to store in the memory 66, the emergency contact URIs of one or more emergency contacts of the user, who may be contacted by emergency services in the event of an emergency call from the user. The processor 64 also controls operation of the UE so as to provide the emergency contact URIs to the IMS network, either when the UE registers in the IMS network, or during an emergency call procedure.

The embodiments described provide a mechanism that allows the person in distress in an emergency to receive attention more quickly in response to an emergency call. This is because the emergency services provided by a PSAP are able to obtain contact information, and optionally also location information of the friends, family or other trusted associates of a user. This means that the emergency service can call or notify any of these contacts, either to assist in the emergency or to provide other important or potentially life-saving information.

The invention claimed is:

1. A method of operating an emergency call procedure in a telecommunications network, the method comprising:
storing, for a user of an Internet Protocol Multimedia Subsystem (IMS) network, emergency contact Uniform Resource Identifiers (URIs) of one or more emergency contacts of the user who may be contacted by emergency services in an event of an emergency call from the user;
receiving an emergency call from the user;
providing the emergency contact URIs to a Public Safety Answering Point (PSAP); and
obtaining geographical location information relating to a geographical location of the one or more emergency contacts of the user, and providing the geographical location information to the PSAP, thereby enabling the PSAP to identify any of the one or more emergency contacts of the user who are in a geographical vicinity of the user.

2. The method of claim 1, wherein the emergency contact URIs are stored at a Home Subscriber Server (HSS) of the user, the HSS providing the emergency contact URIs to the IMS network when the user registers in the IMS network.

3. The method of claim 1, wherein the emergency contact URIs are provided to the IMS network by a user equipment or an intermediate entity between the UE and the IMS network, as part of a user registration procedure.

4. The method of claim 2, wherein the emergency contact URIs are provided to a Proxy Call Session Control Function (P-CSCF) the P-CSCF forwarding the emergency contact URIs towards a Location Retrieval Function (LRF) or a Gateway Mobile Location Centre (GMLC) when the emergency call from the user is received.

5. The method of claim 4, wherein the emergency contact URIs are sent to an Emergency Call Session Control Function (E-CSCF) when the emergency call from the user is received, the E-CSCF forwarding the emergency contact URIs to the LRF or the GMLC.

6. The method of claim 4, wherein the emergency contact URIs, and optionally the geographical location information, are provided to the PSAP in response to a request sent from the PSAP to the LRF or the GMLC.

7. The method of claim 6, further comprising the PSAP requesting the geographical location information relating to the one or more of the emergency contacts from the LRF or the GMLC, and wherein the LRF or the GMLC retrieves geographical locations of the one or more emergency contacts and provides this to the PSAP.

8. The method of claim 1, wherein the emergency contact URIs are stored at a Home Subscriber Server (HSS) of the user, the HSS providing the emergency contact URIs, to a Location Retrieval Function (LRF) or a Gateway Mobile Location Centre (GMLC) after the emergency call from the user is received.

9. The method of claim 1, wherein the emergency contact URIs are provided to the IMS network by a UE or an intermediate entity between the UE and the IMS network, when the emergency call is received.

10. The method of claim 8, wherein the emergency contact URIs, and the geographical location information, are provided to the PSAP in response to a request from the PSAP to the LRF or the GMLC.

11. A telecommunications network entity configured as a Location Retrieval Function (LRF) or a Gateway Mobile Location Centre (GMLC) and comprising:
a memory for storing data;
an interface for transmitting and receiving communications with other network entities, including at least a Public Safety Answering Point (PSAP); and
a processor controlling operation of the network entity to store in the memory emergency contact Uniform Resource Identifiers (URIs) of one or more emergency contacts of a user who may be contacted by emergency services in an event of an emergency call from the user, and to provide the emergency contact URIs to the PSAP in response to a request received from the PSAP;
wherein the processor controls the entity to retrieve geographical location information relating to a geographical location of the one or more of the emergency contacts of the user, and to provide the geographical location information to the PSAP, thereby enabling the PSAP to identify any of the one or more emergency contacts of the user who are in a geographical vicinity of the user.

12. The network entity of claim 11, wherein the interface is configured to transmit and receive communications with a Home Subscriber Server (HSS) of the user using a Lh or a SLh reference point.

13. A user equipment (UE) of a user where the UE is adapted for wireless communications with a telecommunications network, including an Internet Protocol Multimedia Subsystem (IMS) network, the UE comprising:
a memory for storing data;
an interface for transmitting and receiving communications; and
a processor controlling operation of the UE to store in the memory emergency contact Uniform Resource Identifiers (URIs) of one or more emergency contacts of the user who may be contacted by emergency services in an event of an emergency call from the user, and to provide the emergency contact URIs to the IMS network either when the UE registers in the IMS network, or during an emergency call procedure.

14. The UE of claim 13, wherein the one or more emergency contacts do not include a Public Safety Answering Point (PSAP) support team but includes a friend, a family member, or a trusted associate of the user.

* * * * *